(12) United States Patent
Bian et al.

(10) Patent No.: US 12,147,075 B2
(45) Date of Patent: Nov. 19, 2024

(54) BACK-END-OF-LINE EDGE COUPLERS WITH A TAPERED GRATING

(71) Applicant: GlobalFoundries U.S. Inc., Malta, NY (US)

(72) Inventors: Yusheng Bian, Ballston Lake, NY (US); Rod Augur, Saratoga Springs, NY (US)

(73) Assignee: GlobalFoundries U.S. Inc., Malta, NY (US)

( * ) Notice: Subject to any disclaimer, the term of this patent is extended or adjusted under 35 U.S.C. 154(b) by 176 days.

(21) Appl. No.: 17/741,684

(22) Filed: May 11, 2022

(65) Prior Publication Data

US 2023/0367067 A1 Nov. 16, 2023

(51) Int. Cl.
| | | |
|---|---|---|
| *G02B 6/30* | (2006.01) |
| *G02B 6/12* | (2006.01) |
| *G02B 6/122* | (2006.01) |
| *G02B 6/124* | (2006.01) |
| *G02B 6/13* | (2006.01) |
| *G02B 6/34* | (2006.01) |
| *G02B 6/42* | (2006.01) |

(52) U.S. Cl.
CPC ........... *G02B 6/1228* (2013.01); *G02B 6/305* (2013.01); *G02B 6/4214* (2013.01); *G02B 6/12002* (2013.01); *G02B 2006/12107* (2013.01); *G02B 2006/12147* (2013.01); *G02B 6/124* (2013.01); *G02B 6/13* (2013.01); *G02B 6/34* (2013.01)

(58) Field of Classification Search
CPC .. G02B 6/1228; G02B 6/305; G02B 6/12002; G02B 6/124; G02B 6/134; G02B 6/14; G02B 6/34
See application file for complete search history.

(56) References Cited

U.S. PATENT DOCUMENTS

| 6,813,419 | B2 * | 11/2004 | Matsushima ........ G02B 6/1228 385/124 |
| 9,274,283 | B1 * | 3/2016 | Ellis-Monaghan .......................... G02B 6/12002 |
| 10,126,500 | B2 | 11/2018 | Qi et al. |
| 10,197,731 | B2 | 2/2019 | Teng et al. |

(Continued)

FOREIGN PATENT DOCUMENTS

| FR | 3098312 A1 * | 1/2021 | ......... G02B 6/12002 |
| TW | 202113410 A | 4/2021 | |

OTHER PUBLICATIONS

Machine translation of FR-3098312-A1. (Year: 2021).*

(Continued)

*Primary Examiner* — Michelle R Connelly
*Assistant Examiner* — Emma R. Oxford
(74) *Attorney, Agent, or Firm* — Thompson Hine LLP; Anthony Canale

(57) ABSTRACT

Structures for an edge coupler and methods of fabricating such structures. The structure comprises a substrate and a back-end-of-line edge coupler including a waveguide core and a grating positioned in a vertical direction between the substrate and the waveguide core. The first waveguide core includes a first longitudinal axis, the grating includes a second longitudinal axis and a plurality of segments positioned with a spaced-apart arrangement along the second longitudinal axis, and the second longitudinal axis is aligned substantially parallel to the first longitudinal axis.

17 Claims, 16 Drawing Sheets

(56) References Cited

U.S. PATENT DOCUMENTS

| | | | | |
|---|---|---|---|---|
| 10,816,726 | B1* | 10/2020 | Peng | G02B 6/3636 |
| 10,989,876 | B1* | 4/2021 | Peng | G02B 6/305 |
| 11,048,045 | B1* | 6/2021 | Tsang | G02B 6/262 |
| 11,495,700 | B2* | 11/2022 | Bian | G02B 6/1228 |
| 11,880,065 | B2* | 1/2024 | Bian | G02B 6/13 |
| 12,038,615 | B2* | 7/2024 | Bian | G02B 6/1228 |
| 2015/0247974 | A1* | 9/2015 | Painchaud | G02B 6/124 385/28 |
| 2017/0017034 | A1 | 1/2017 | Painchaud et al. | |
| 2017/0317471 | A1* | 11/2017 | Lor | G02B 6/124 |
| 2018/0039027 | A1* | 2/2018 | Kato | G02B 6/1228 |
| 2019/0086611 | A1* | 3/2019 | Daniel | G02B 6/305 |
| 2021/0003775 | A1 | 1/2021 | Psaila et al. | |
| 2021/0013699 | A1* | 1/2021 | Guo | H01S 5/04256 |
| 2021/0096311 | A1 | 4/2021 | Yu et al. | |
| 2022/0107543 | A1* | 4/2022 | Handanhal Ramachandra | G02F 1/295 |
| 2022/0326441 | A1* | 10/2022 | Sapra | G02B 6/124 |
| 2024/0210620 | A1* | 6/2024 | Zheng | G02B 6/125 |

OTHER PUBLICATIONS

Pavel Cheben et al., "Refractive index engineering with subwavelength gratings for efficient microphotonic couplers and planar waveguide multiplexers," Optics Letter 35, 2526-2528 (2010).

T. Barwicz et al., "An o-band metamaterial converter interfacing standard optical fibers to silicon nanophotonic waveguides," 2015 Optical Fiber Communications Conference and Exhibition (OFC), pp. 1-3, doi: 10.1364/OFC.2015.Th3F.3 (2015).

M. Teng et al., "Trident Shape SOI Metamaterial Fiber-to-Chip Edge Coupler," 2019 Optical Fiber Communications Conference and Exhibition (OFC), pp. 1-3, Tu2J.6 (2019).

Kuanping Shang et al., "Silicon nitride tri-layer vertical Y-junction and 3D couplers with arbitrary splitting ratio for photonic integrated circuits," Optics Express 25, 10474-10483 (2017).

R. S. Tummidi and M. Webster, "Multilayer Silicon Nitride-Based Coupler Integrated into a Silicon Photonics Platform with <1 dB Coupling Loss to a Standard SMF over O, S, C and L Optical Bands, " 2020 Optical Fiber Communications Conference and Exhibition (OFC), pp. 1-3, Th2A.10 (2020).

Mu, Xin & Wu, Sailong & Cheng, Lirong & Fu, H. Y. Edge Couplers in Silicon Photonic Integrated Circuits: A Review. Applied Sciences. 10. 1538. 10.3390/app10041538 (2020).

Martin Papes et al., "Fiber-chip edge coupler with large mode size for silicon photonic wire waveguides," Opt. Express 24, 5026-5038 (2016).

K. Giewont et al., "300-mm Monolithic Silicon Photonics Foundry Technology," in IEEE Journal of Selected Topics in Quantum Electronics, vol. 25, No. 5, pp. 1-11, Sep.-Oct. 2019, Art No. 8200611, doi: 10.1109/JSTQE.2019.2908790.

Y. Bian et al., "3D Integrated Laser Attach Technology on 300-mm Monolithic Silicon Photonics Platform," 2020 IEEE Photonics Conference (IPC), pp. 1-2, doi: 10.1109/IPC47351.2020.9252280 (2020).

Y. Bian et al., "Monolithically integrated silicon nitride platform," 2021 Optical Fiber Communications Conference and Exhibition (OFC), pp. 1-3 (2021).

Y. Bian et al., "Hybrid III-V laser integration on a monolithic silicon photonic platform," in Optical Fiber Communication Conference (OFC) 2021, P. Dong, J. Kani, C. Xie, R. Casellas, C. Cole, and M. Li, eds., OSA Technical Digest (Optica Publishing Group), paper M5A.2 (2021).

B. Peng et al., "A CMOS Compatible Monolithic Fiber Attach Solution with Reliable Performance and Self-alignment," in Optical Fiber Communication Conference (OFC), OSA Technical Digest (Optica Publishing Group, 2020), paper Th3I.4 (2020).

Y. Bian et al., "Towards low-loss monolithic silicon and nitride photonic building blocks in state-of-the-art 300mm CMOS foundry," in Frontiers in Optics / Laser Science, B. Lee, C. Mazzali, K. Corwin, and R. Jason Jones, eds., OSA Technical Digest (Optica Publishing Group), paper FW5D.2 (2020).

M. Rakowski et al., "45nm CMOS—Silicon Photonics Monolithic Technology (45CLO) for next-generation, low power and high speed optical interconnects," in Optical Fiber Communication Conference (OFC) 2020, OSA Technical Digest (Optica Publishing Group), paper T3H.3 (2020).

Y. Bian et al., "Integrated Laser Attach Technology on a Monolithic Silicon Photonics Platform," 2021 IEEE 71st Electronic Components and Technology Conference (ECTC), pp. 237-244, doi: 10.1109/ECTC32696.2021.00048 (2021).

Bian, Yusheng et al., "Edge Couplers in the Back-End-Of-Line Stack of a Photonics Chip" filed on Jan. 19, 2021 as a U.S. Appl. No. 17/151,955.

Bian, Yusheng et al., "Metamaterial Edge Couplers in the Back-End-Of-Line Stack of a Photonics Chip" filed on Feb. 11, 2021 as a U.S. Appl. No. 17/173,639.

Sahin, Asli et al., "Photonics Integrated Circuit With Silicon Nitride Waveguide Edge Coupler" filed on Feb. 19, 2021 as a U.S. Appl. No. 17/179,532.

Bian, Yusheng et al., "Metamaterial Layers for Use With Optical Components" filed on Mar. 2, 2022 as a U.S. Appl. No. 17/684,840.

Bian, Yusheng et al., "Edge Couplers Including a Metamaterial Layer" filed on Mar. 23, 2022 as a U.S. Appl. No. 17/701,942.

Bian, Yusheng et al., "Optical Components in the Back-End-Of-Line Stack of a Photonics Chip" filed on Jan. 12, 2021 as a U.S. Appl. No. 17/146,864.

Bian, Yusheng et al., "Stacked Edge Couplers in the Back-Of-Line Stack of a Photonic Chip" filed on Apr. 5, 2022 as a U.S. Appl. No. 17/1658,092.

Bian, Yusheng et al., "Edge Couplers in the Back-End-Of-Line Stack of a Photonic Chip Having a Sealed Cavity" filed on Apr. 11, 2022 as a U.S. Appl. No. 17/1658,821.

* cited by examiner

US 12,147,075 B2

BACK-END-OF-LINE EDGE COUPLERS WITH A TAPERED GRATING

BACKGROUND

The disclosure relates to photonics chips and, more specifically, to structures for an edge coupler and methods of fabricating such structures.

Photonics chips are used in many applications and systems including, but not limited to, data communication systems and data computation systems. A photonics chip integrates optical components, such as waveguides, photodetectors, modulators, and optical power splitters, and electronic components, such as field-effect transistors, into a unified platform. Among other factors, layout area, cost, and operational overhead may be reduced by the integration of both types of components on the same chip.

An edge coupler, also known as a spot-size converter, is commonly used for coupling light of a given mode from a light source, such as a laser or an optical fiber, near an edge of a photonics chip to optical components on the photonics chip. The edge coupler supports mode transformation and mode size variation associated with mode conversion when light is transferred from the light source to the edge coupler. However, due to a significant mismatch between the large mode size of the light and the small dimensions of the edge coupler, the edge coupler is initially unable to fully confine the incident mode that is received from the light source. Consequently, conventional edge couplers may be susceptible to significant leakage loss of light to the substrate. The leakage loss may be particularly high when a conventional edge coupler receives light of the transverse magnetic polarization mode from a single-mode optical fiber operating as the light source.

Improved structures for an edge coupler and methods of fabricating such structures are needed.

SUMMARY

In an embodiment of the invention, a structure comprises a substrate and a back-end-of-line edge coupler including a waveguide core and a grating positioned in a vertical direction between the substrate and the waveguide core. The first waveguide core includes a first longitudinal axis, the grating includes a second longitudinal axis and a plurality of segments positioned with a spaced-apart arrangement along the second longitudinal axis, and the second longitudinal axis is aligned substantially parallel to the first longitudinal axis.

In an embodiment of the invention, a method comprises forming a back-end-of-line edge coupler including a waveguide core and a grating positioned in a vertical direction between a substrate and the waveguide core. The waveguide core includes a first longitudinal axis, the grating includes a second longitudinal axis and a plurality of segments positioned with a spaced-apart arrangement along the second longitudinal axis, and the second longitudinal axis is aligned substantially parallel to the first longitudinal axis.

BRIEF DESCRIPTION OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention. In the drawings, like reference numerals refer to like features in the various views.

DETAILED DESCRIPTION

Figure 1:
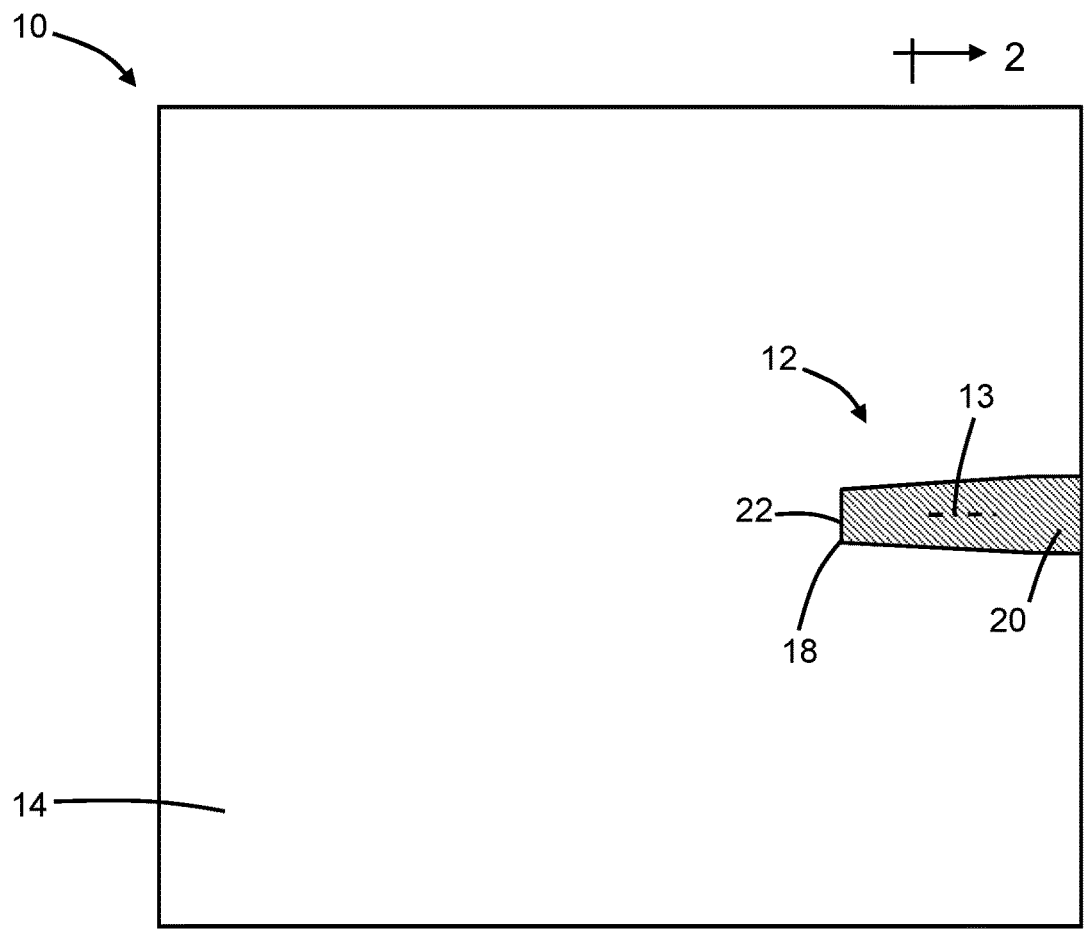
FIG. 1 is a top view of a structure at an initial fabrication stage of a processing method in accordance with embodiments of the invention.
Figure 2:
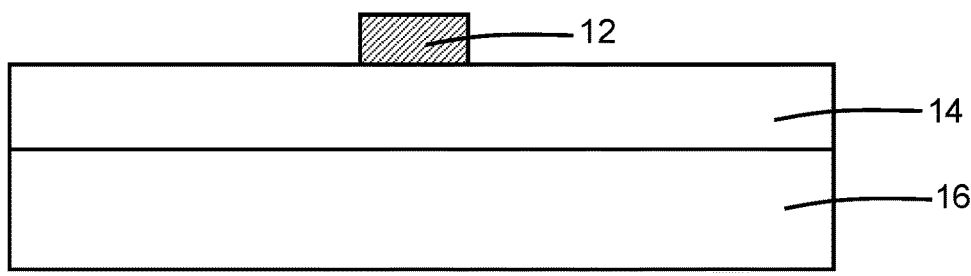
FIG. 2 is a cross-sectional view taken generally along line 2-2 in FIG. 1.
Figure 3:
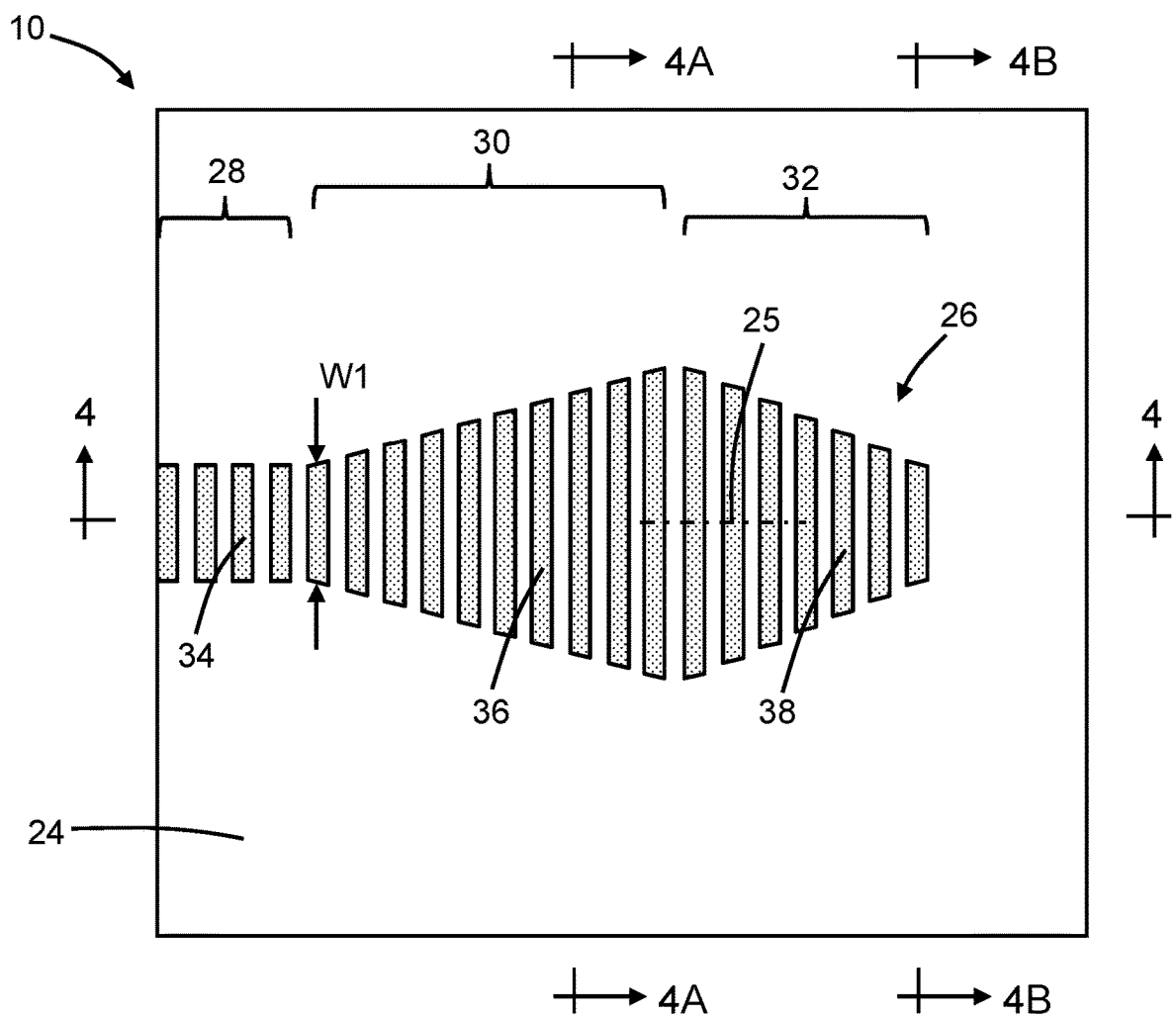
FIG. 3 is a top view of the structure at a fabrication stage of the processing method subsequent to FIG. 1.
Figure 4:
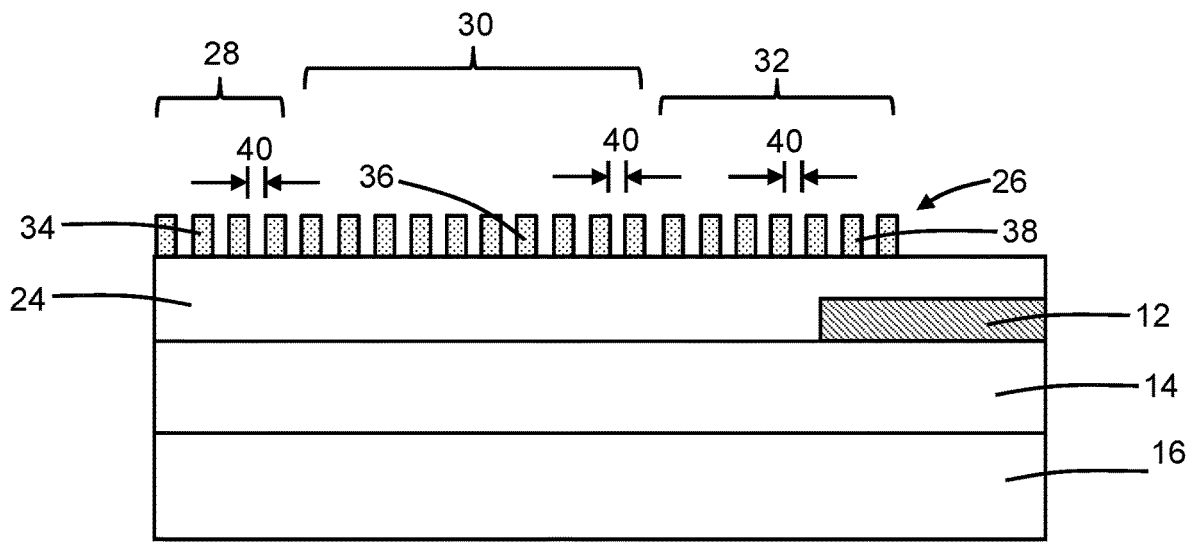
FIG. 4 is a cross-sectional view taken generally along line 4-4 in FIG. 3.
Figure 4A:
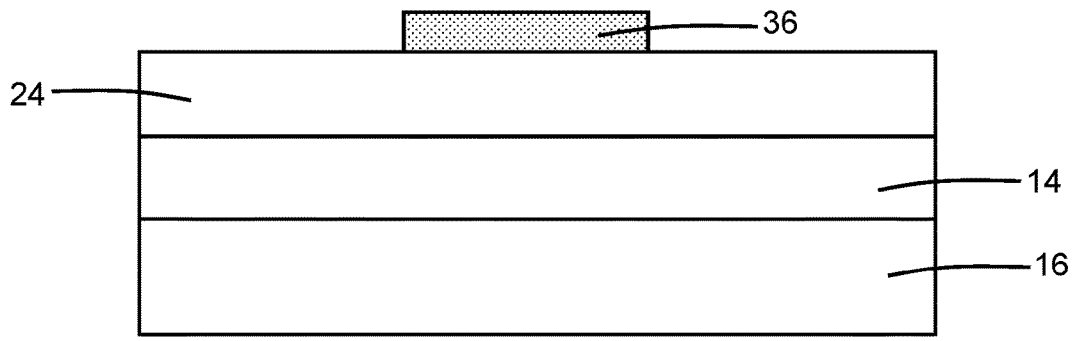
FIG. 4A is a cross-sectional view taken generally along line 4A-4A in FIG. 3.
Figure 4B:
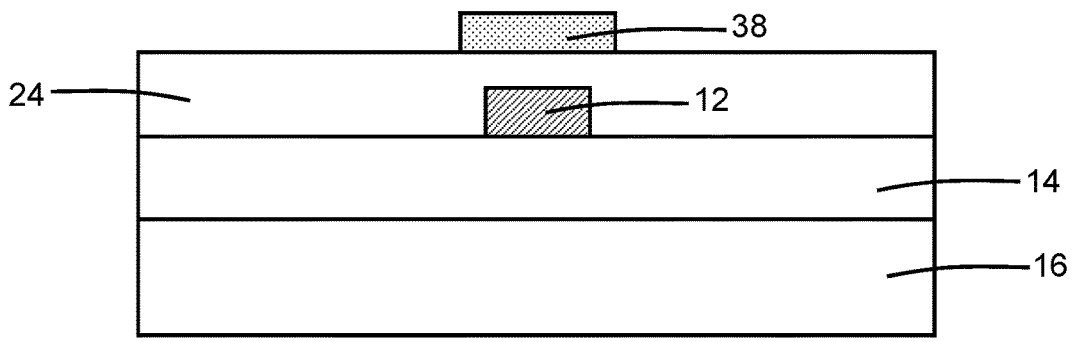
FIG. 4B is a cross-sectional view taken generally along line 4B-4B in FIG. 3.
Figure 5:
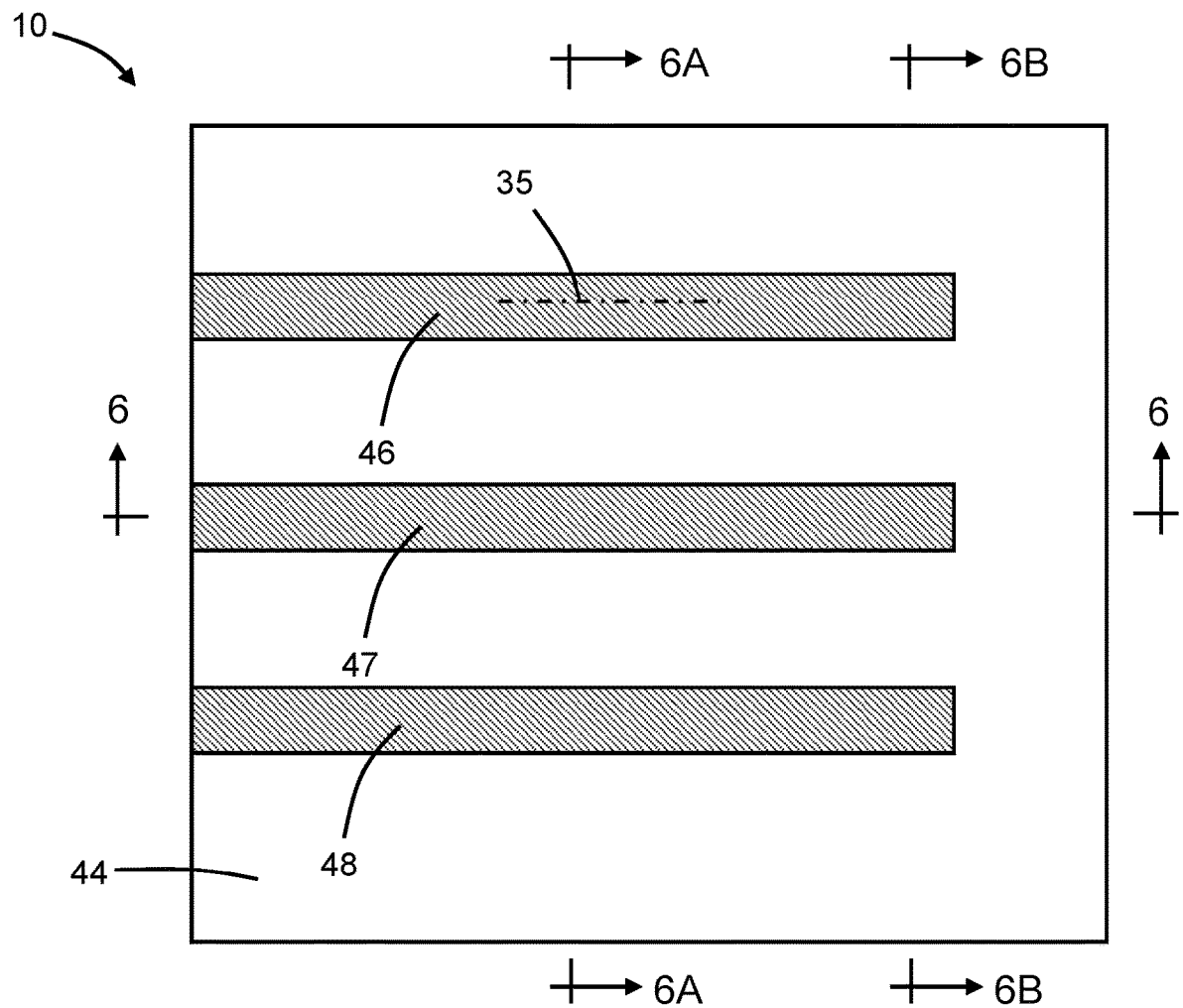
FIG. 5 is a top view of the structure at a fabrication stage of the processing method subsequent to FIG. 3.
Figure 6:
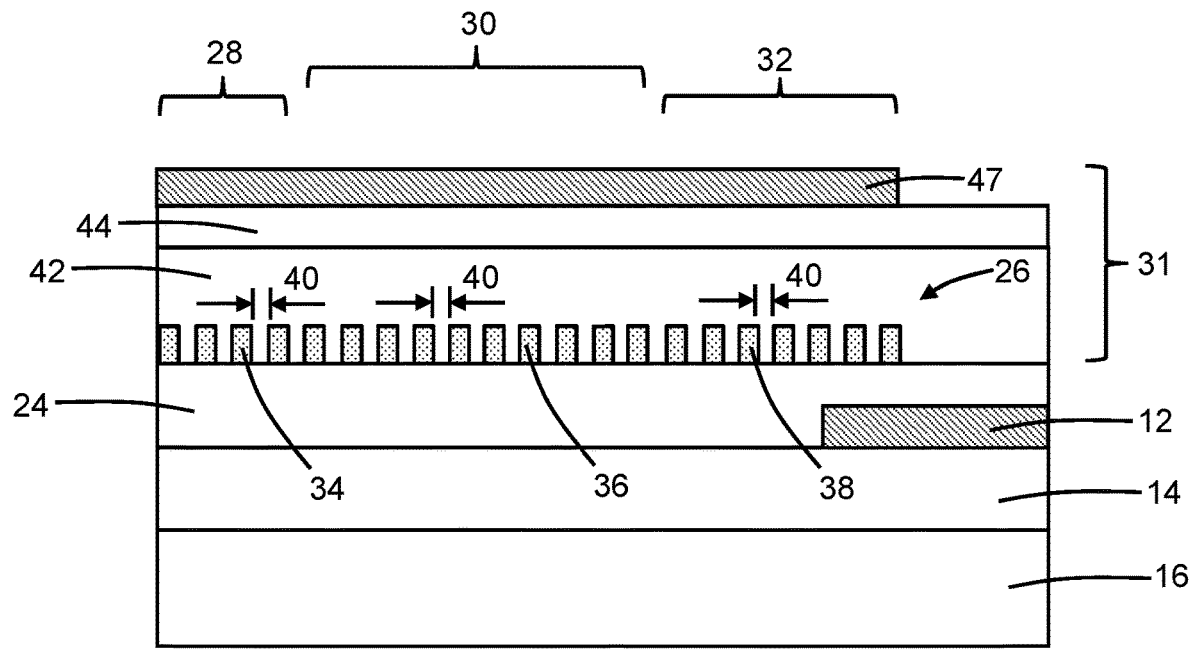
FIG. 6 is a cross-sectional view taken generally along line 6-6 in FIG. 5.
Figure 6A:
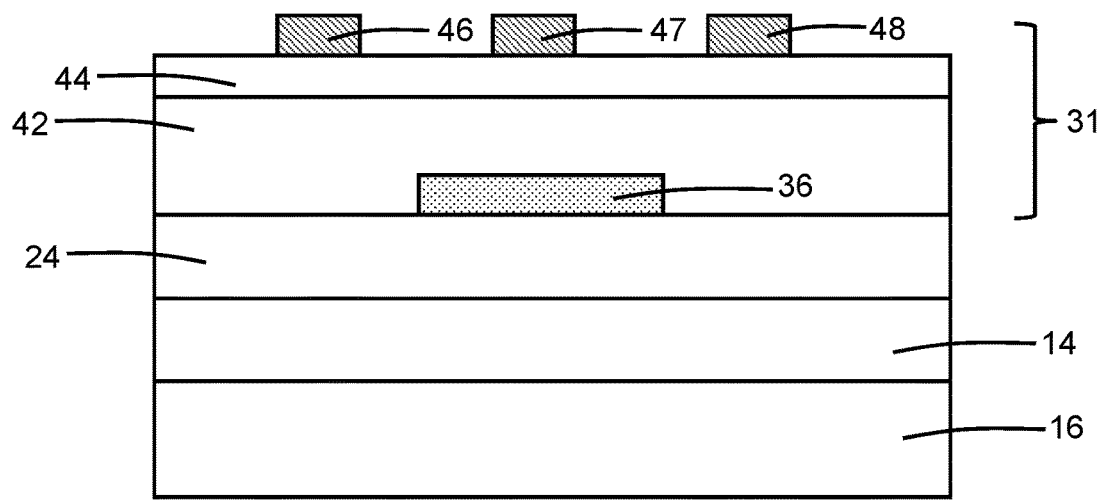
FIG. 6A is a cross-sectional view taken generally along line 6A-6A in FIG. 5.
Figure 6B:
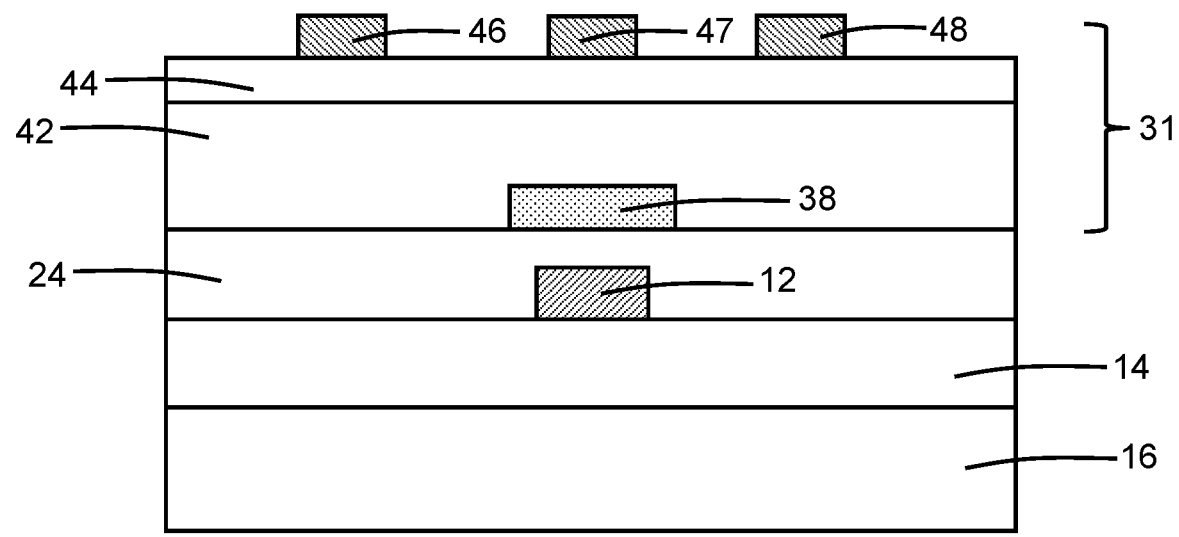
FIG. 6B is a cross-sectional view taken generally along line 6B-6B in FIG. 5.
Figure 7:
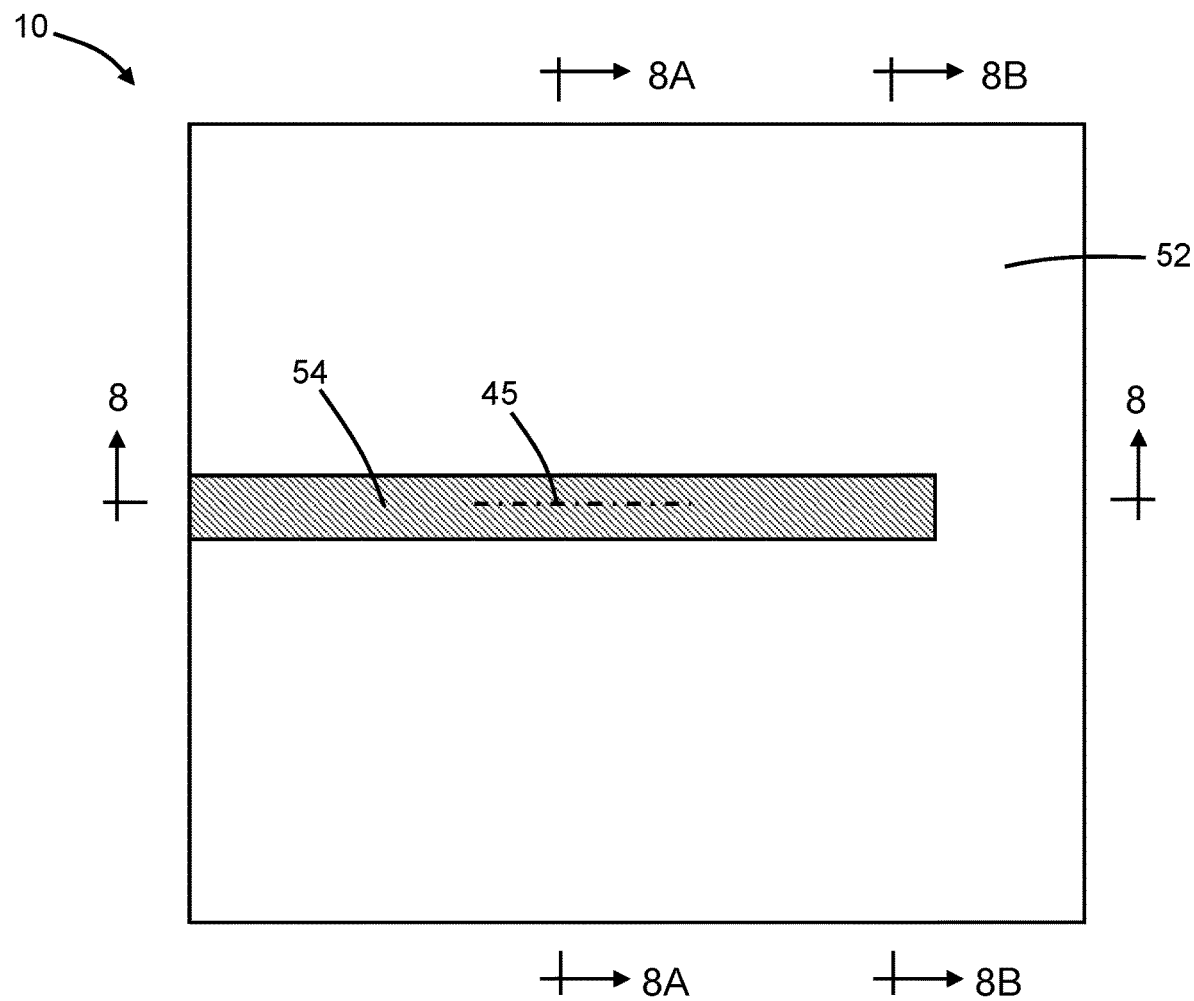
FIG. 7 is a top view of the structure at a fabrication stage of the processing method subsequent to FIG. 5.
Figure 8:
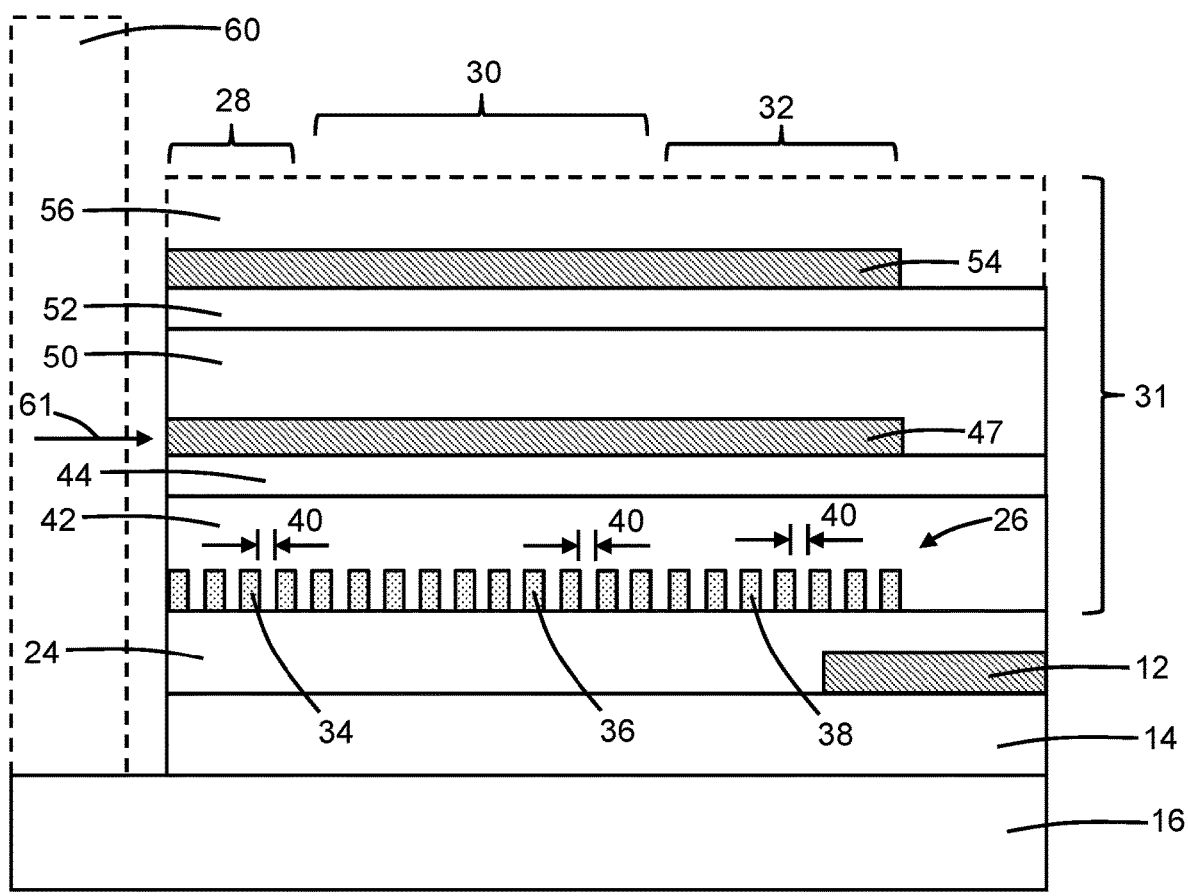
FIG. 8 is a cross-sectional view taken generally along line 8-8 in FIG. 7.
Figure 8A:
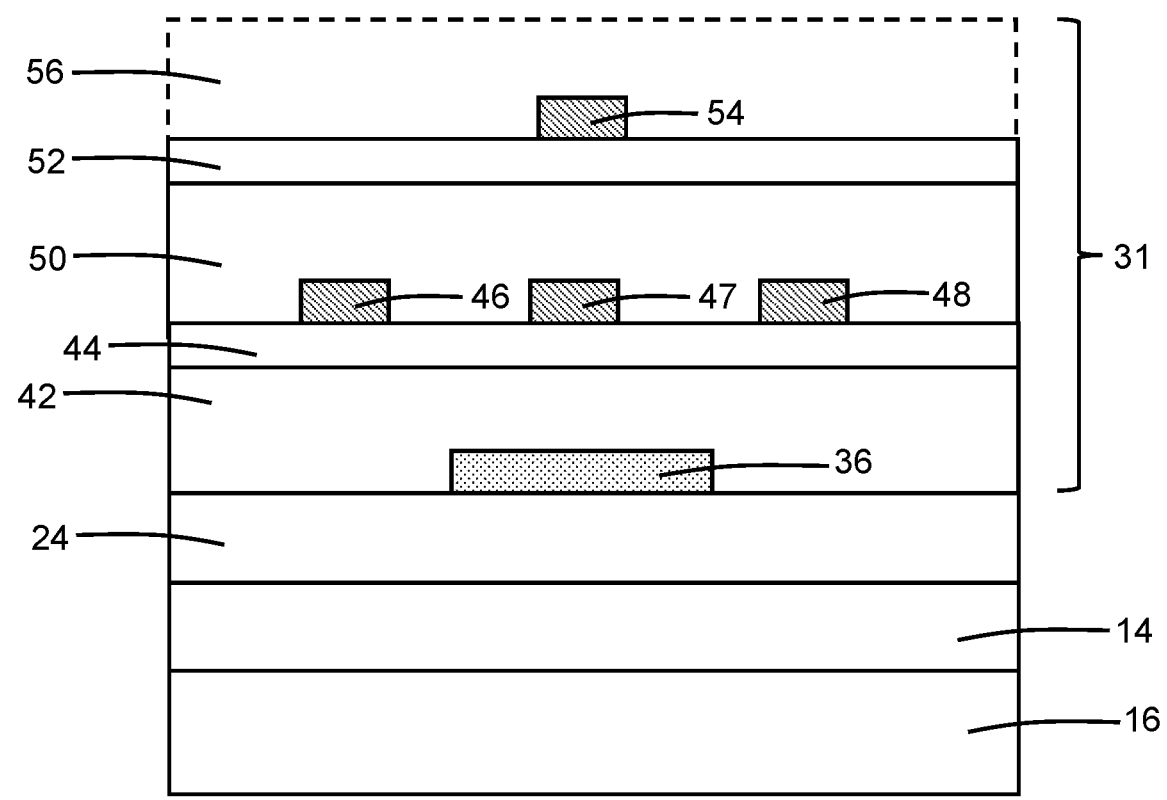
FIG. 8A is a cross-sectional view taken generally along line 8A-8A in FIG. 7.
Figure 8B:
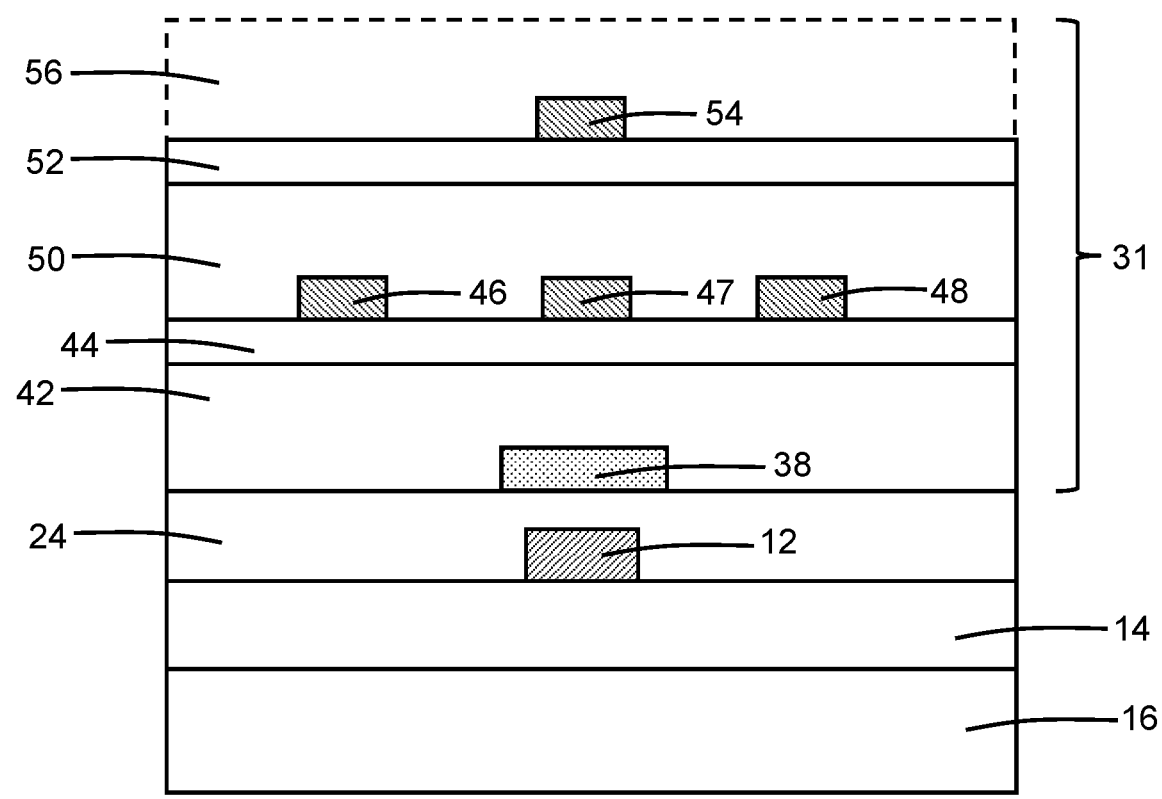
FIG. 8B is a cross-sectional view taken generally along line 8B-8B in FIG. 7.

With reference to FIGS. 1, 2 and in accordance with embodiments of the invention, a structure 10 includes a waveguide core 12 that is positioned over a dielectric layer 14 and a substrate 16. In an embodiment, the dielectric layer 14 may be comprised of a dielectric material, such as silicon dioxide, and the substrate 16 may be comprised of a semiconductor material, such as single-crystal silicon. In an embodiment, the dielectric layer 14 may be a buried oxide layer of a silicon-on-insulator substrate, and the dielectric layer 14 may separate the waveguide core 12 from the substrate 16. In an alternative embodiment, an additional dielectric layer comprised of a dielectric material, such as silicon dioxide, may be positioned between the dielectric layer 14 and the waveguide core 12.

The waveguide core 12 may be aligned along a longitudinal axis 13. The waveguide core 12 may include an inverse taper 18, a section 20 connected to the inverse taper 18, and an end surface 22 that terminates the inverse taper 18. An inverse taper refers to a tapered section of a waveguide core characterized by a gradual increase in width along a mode propagation direction. In that regard, the inverse taper 18 increases in width with increasing distance along the longitudinal axis 13 from the end surface 22. The section 20 of the waveguide core 12 may be connected to other optical components. In an alternative embodiment, the section 20 of the waveguide core 12 may include another inverse taper that is adjoined to the inverse taper 18 to provide a compound taper.

The waveguide core 12 may be comprised of a dielectric material, such as silicon nitride, having a refractive index greater than the refractive index of silicon dioxide. In an alternative embodiment, the waveguide core 12 may be comprised of silicon oxynitride. In an alternative embodiment, the waveguide core 12 may be comprised of single-crystal silicon. In an embodiment, the waveguide core 12 may be formed by depositing a layer of its constituent material on the dielectric layer 14 and patterning the deposited layer by lithography and etching processes.

With reference to FIGS. 3, 4, 4A, 4B in which like reference numerals refer to like features in FIGS. 1, 2 and at a subsequent fabrication stage, a dielectric layer 24 is formed over the waveguide core 12. The dielectric layer 24 may be comprised of a dielectric material, such as silicon dioxide. The waveguide core 12 is embedded in the dielectric layer 24 because the dielectric layer 24 is thicker than the height of the waveguide core 12. The thickness of the dielectric layer 24 and the height of the waveguide core 12 may be adjustable variables. The dielectric material constituting the dielectric layer 24 may have a lower refractive index than the dielectric material constituting the waveguide core 12.

The structure 10 may further include a multiple-taper grating 26 that is formed on the dielectric layer 24. The grating 26 includes segments 34 that are distributed along the length of a non-tapered section 28, segments 36 that are distributed along the length of an inversely-tapered section 30, and segments 38 that are distributed along the length of a tapered section 32. The segments 34, 36, 38 are positioned along a longitudinal axis 25 of the grating 26 with the segments 36 adjacent to the segments 34, the segments 38 adjacent to the segments 36, and the segments 36 longitudinally positioned between the segments 34 and the segments 38. The grating 26 is terminated at one end by one of the segments 34 and is terminated at an opposite end by one of the segments 38. In an embodiment, the segments 34, 36, 38 may be centered on the longitudinal axis 25. In an embodiment, the longitudinal axis 25 of the grating 26 may be aligned parallel or substantially parallel to the longitudinal axis 13 of the waveguide core 12. Adjacent pairs of the segments 34, adjacent pairs of the segments 36, and adjacent pairs of the segments 38 are separated by gaps 40 having a given dimension in a direction along the longitudinal axis 25.

In an embodiment, each of the segments 34, 36, 38 may have a square or rectangular cross-section in a direction parallel to the longitudinal axis 25 and in a direction transverse to the longitudinal axis 25. In an embodiment, the pitch and duty cycle of the segments 34, the segments 36, and/or the segments 38 may be uniform to define a periodic arrangement. In alternative embodiments, the pitch and/or the duty cycle of the segments 34, the segments 36, and/or the segments 38 may be apodized (i.e., non-uniform) to define a non-periodic arrangement. The segments 34, 36, 38 may be dimensioned and positioned at small enough pitch so as to define a sub-wavelength grating-like structure that does not radiate or reflect light at a wavelength of operation, such as a wavelength in a range of 400 nm to 3000 nm.

The grating 26 has a total length that includes the individual lengths for the non-tapered section 28, the inversely-tapered section 30, and the tapered section 32, and the segments 34, 36, 38 have a width W1 in a direction transverse to the longitudinal axis 25. The width W1 of the segments 34 may be constant over the length of the non-tapered section 28, the width W1 of the segments 36 may increase over the length of the inversely-tapered section 30 with increasing distance from the non-tapered section 28, and the width W1 of the segments 38 may decrease over the length of the tapered section 32 with increasing distance from the non-tapered section 28.

The grating 26 may be comprised of a dielectric material, such as silicon-carbon nitride or hydrogenated silicon-carbon nitride, having a refractive index that is greater than the refractive index of silicon dioxide. In an alternative embodiment, the grating 26 may be comprised of silicon nitride or silicon oxynitride. In an embodiment, the grating 26 may be formed by depositing a layer of its constituent material on the dielectric layer 24 and patterning the deposited layer by lithography and etching processes to form the segments 34, 36, 38. In the representative embodiment, the segments 34, 36, 38 may be disconnected from each other. In an alternative embodiment, a slab layer may connect lower portions of the segments 34, 36, 38. The slab layer may be formed when the grating 26 is patterned, and the slab layer, which is positioned on the dielectric layer 24, has a thickness that is less than the thickness of the segments 34, 36, 38.

With reference to FIGS. 5, 6, 6A, 6B in which like reference numerals refer to like features in FIGS. 3, 4, 4A, 4B and at a subsequent fabrication stage, dielectric layers 42, 44 of a back-end-of-line stack 31 may be formed over the dielectric layer 24 and grating 26. The grating 26, which is embedded in the dielectric layer 42, is included in the back-end-of-line stack 31. The dielectric layers 42, 44 may be comprised of a dielectric material, such as tetraethyl-orthosilicate silicon dioxide, fluorinated-tetraethylorthosilicate silicon dioxide, silicon dioxide, silane oxide, or a variant of silicon oxide. The dielectric layer 44 is formed on the dielectric layer 42.

The dielectric material of the dielectric layer 42 is disposed in the gaps 40 between adjacent pairs of the segments 34, 36, 38. The segments 34, 36, 38 and the dielectric material of the dielectric layer 42 in the gaps 40 may define a metamaterial structure in which the dielectric material constituting the segments 34, 36, 38 has a higher refractive index than the dielectric material of the dielectric layer 42 and the segments 34, 36, 38 define a subwavelength grating-like structure. The metamaterial structure including the segments 34, 36, 38 and the dielectric material of the dielectric layer 42 in the gaps 40 can be treated as a homogeneous material with an effective refractive index that is intermediate between the refractive index of the dielectric material constituting the segments 34, 36, 38 and the refractive index of the dielectric material of the dielectric layer 42.

The structure 10 may further include waveguide cores 46, 47, 48 that are formed in a level of the back-end-of-line stack 31 over the level of the grating 26. The waveguide cores 46, 47, 48 have a laterally-spaced, side-by-side arrangement on the dielectric layer 44. The waveguide cores 46, 47, 48 may be comprised of a dielectric material, such as silicon nitride, having a refractive index greater than the refractive index of silicon dioxide. In an embodiment, the waveguide cores 46, 47, 48 may be formed by depositing a layer of their constituent material on the dielectric layer 44 and patterning the deposited layer by lithography and etching processes. In an embodiment, the waveguide cores 46, 47, 48 may be comprised of a different dielectric material than the grating 26.

Each of the waveguide cores 46, 47, 48 may be aligned along a longitudinal axis 35. The longitudinal axes 35 may be aligned parallel or substantially parallel to each other, and the longitudinal axes 35 may be aligned parallel or substantially parallel to the longitudinal axis 25 of the grating 26. The waveguide core 46 may be truncated at opposite ends to define a length for the waveguide core 46, the waveguide core 47 may be truncated at opposite ends to define a length for the waveguide core 47, and the waveguide core 48 may be truncated at opposite ends to define a length for the waveguide core 48. In an embodiment, the lengths of the waveguide cores 46, 47, 48 may be equal or substantially equal. The waveguide core 47 is positioned in a lateral direction between the waveguide core 46 and the waveguide core 48, and the waveguide core 47 may overlap with the segments 34, 36, 38 of the grating 26. In an embodiment, the waveguide cores 46, 47, 48 may be laterally positioned with a symmetrical arrangement relative to the segments 34, 36, 38 of the grating 26.

With reference to FIGS. 7, 8, 8A, 8B in which like reference numerals refer to like features in FIGS. 5, 6, 6A, 6B and at a subsequent fabrication stage, dielectric layers 50, 52 of the back-end-of-line stack 31 may be formed over the waveguide cores 46, 47, 48. The dielectric layers 50, 52 may be comprised of a dielectric material, such as tetraethylorthosilicate silicon dioxide, fluorinated-tetraethylorthosilicate silicon dioxide, silicon dioxide, silane oxide, or a variant of silicon oxide. The waveguide cores 46, 47, 48 are embedded in the dielectric layer 50.

The structure 10 may further include a waveguide core 54 that is formed in a level of the back-end-of-line stack 31 over the level of the waveguide cores 46, 47, 48. In an embodiment, the waveguide core 54 may overlap with the waveguide core 47. The waveguide core 54 may be aligned along a longitudinal axis 45. In an embodiment, the longitudinal axis 45 of the waveguide core 54 may be aligned parallel or substantially parallel to the longitudinal axis 25 of the grating 26. The waveguide core 54 may be truncated at opposite ends such that the waveguide core 54 has a length. In an embodiment, the waveguide core 54 and the waveguide core 47 may have equal or substantially equal lengths. In an alternative embodiment, the waveguide core 54 may be shorter in length than the waveguide core 47.

The waveguide core 54 may be comprised of a dielectric material, such as silicon nitride, having a refractive index greater than the refractive index of silicon dioxide. In an embodiment, the waveguide core 54 may be formed by depositing a layer of its constituent material on the dielectric layer 52 and patterning the deposited layer by lithography and etching processes. In an embodiment, the waveguide core 54 may be comprised of the same dielectric material as the waveguide cores 46, 47, 48. In an embodiment, the waveguide core 54 may be comprised of a different dielectric material than the grating 26.

Additional dielectric layers 56 (diagrammatically shown in dashed lines), including a dielectric layer 56 providing a moisture barrier, of the back-end-of-line stack 31 may be formed over the waveguide core 54.

The grating 26, waveguide cores 46, 47, 48, and waveguide core 54 may define an edge coupler of the structure 10 that is located in the back-end-of-line stack 31. A light source 60 may be positioned adjacent to the edge coupler. In an embodiment, the light source 60 may be a single-mode optical fiber positioned at a chip edge adjacent to the edge coupler and inside a cavity formed in the back-end-of-line stack 31, the substrate 16, or both. In an alternative embodiment, the light source 60 may be a semiconductor laser positioned at a chip edge adjacent to the edge coupler, and the semiconductor laser may be mounted (e.g., flip-chip bonded) inside a cavity formed in the substrate 16. In the representative embodiment, the substrate 16 may be solid beneath the edge coupler.

The segments 36 of the grating 26, which are distributed in the inversely-tapered section 30, are positioned along the longitudinal axis 25 between the light source 60 and the segments 38 of the grating 26, which are distributed in the tapered section 32. The width of the segments 36 in the inversely-tapered section 30 increases with increasing distance from the light source 60, and the width of the segments 38 in the tapered section 32 decreases with increasing distance from the light source 60. The segments 34, which are distributed in the non-tapered section 28, are positioned along the longitudinal axis 25 between the light source 60 and the inversely-tapered section 30.

The structure 10, in any of its embodiments described herein, may be deployed as an edge coupler in a photonics chip. The photonics chip may include electronic components, such as field-effect transistors, in addition to optical components.

Light (e.g., laser light) may be directed in a mode propagation direction 61 from the light source 60 toward the edge coupler for coupling by the edge coupler to the waveguide core 12. The light received by the edge coupler may have a given wavelength, intensity, mode shape, and mode size, and the edge coupler may provide spot size conversion for the light. In alternative embodiments, the edge coupler may include additional waveguide cores in the level including the waveguide core 54. In alternative embodiments, the edge coupler may include additional or fewer waveguide cores in the level including the waveguide cores 46, 47, 48.

The multiple-taper grating 26 of the structure 10 may exhibit a reduced insertion loss from conversion and propagation leakage to the substrate 16. The reduced insertion loss may permit the elimination of an undercut as a leakage loss prevention measure and may result in an undercut-free, solid substrate 16 beneath the edge coupler. Eliminating the undercut simplifies the process flow for forming the edge coupler, as well as potential mechanical issues arising from removing a portion of the substrate 16 under the dielectric layer 14 and therefore eliminating a portion of the support beneath the edge coupler. The structure 10 including the grating 26 may also be effective to suppress higher order modes, as well as to provide mode conversion characterized by fewer mode fluctuations and improved through-band performance for fundamental modes.

Figure 9:
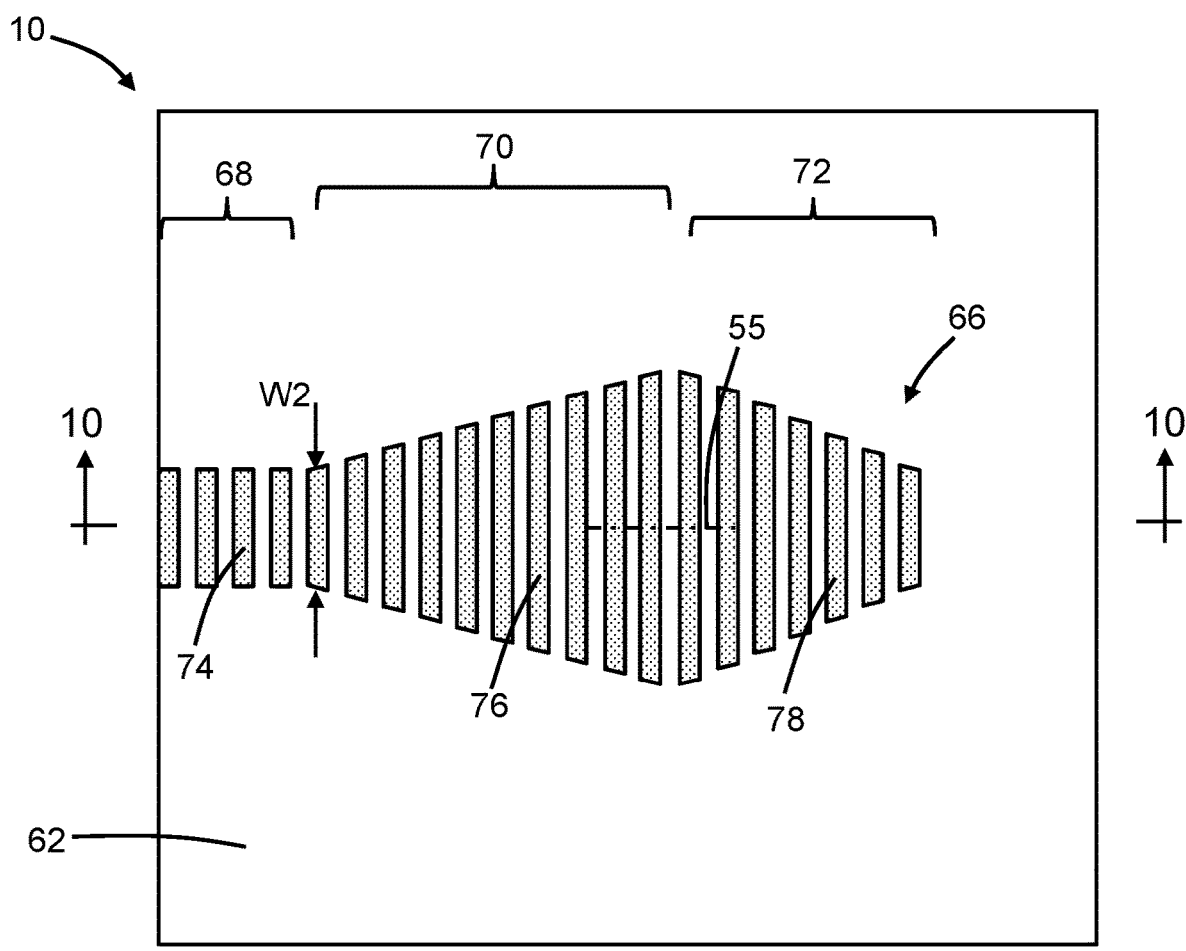
FIG. 9 is a top view of a structure in accordance with alternative embodiments of the invention.
Figure 10:
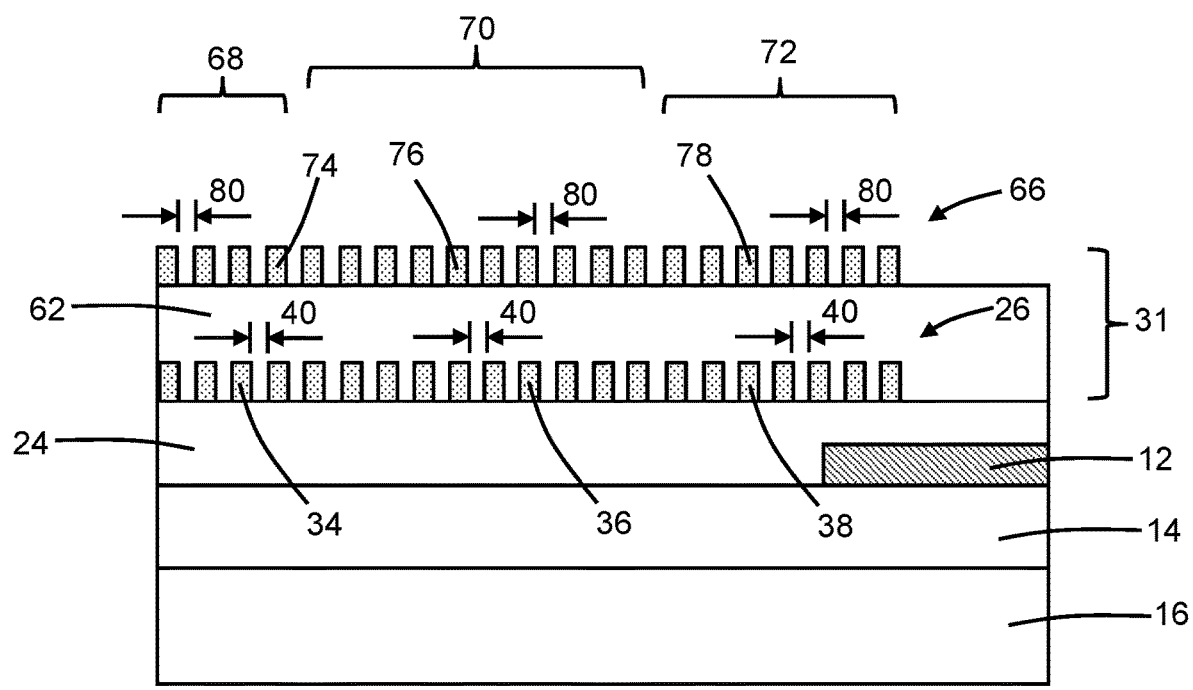
FIG. 10 is a cross-sectional view taken generally along line 10-10 in FIG. 9.

With reference to FIGS. 9, 10 and in accordance with alternative embodiments of the invention, a dielectric layer 62 may be formed over the grating 26. The dielectric layer 62 may be comprised of a dielectric material, such as silicon dioxide. The grating 26 is embedded in the dielectric layer 62 because the dielectric layer 62 is thicker than the height of the grating 26. The thickness of the dielectric layer 62 and the height of the grating 26 may be adjustable variables. The dielectric material constituting the dielectric layer 62 may have a lower refractive index than the material constituting the grating 26. The dielectric material of the dielectric layer 62 is disposed in the gaps 40 between adjacent pairs of the segments 34, 36, 38. The segments 34, 36, 38 and the dielectric material of the dielectric layer 62 in the gaps 40 may define a metamaterial structure.

A multiple-taper grating 66 may be added to the edge coupler of the structure 10. The grating 66 is positioned in a level of the back-end-of-line stack 31 between the level including the grating 26 and the level including the subsequently-formed waveguide cores 46, 47, 48. The grating 26 is positioned in a vertical direction between the grating 66 and the substrate 16. The grating 66 includes segments 74 that are distributed along the length of a non-tapered section 68, segments 76 that are distributed along the length of an inverse taper 70, and segments 78 that are distributed along the length of a taper 72. The segments 74, 76, 78 are positioned along a longitudinal axis 55 of the grating 66 with the segments 76 adjacent to the segments 74, the segments 78 adjacent to the segments 76, and the segments 76 longitudinal positioned between the segments 74 and the segments 78. The grating 66 is terminated at one end by one of the segments 74 and is terminated at an opposite end by one of the segments 78. In an embodiment, the segments 74, 76, 78 may be centered on the longitudinal axis 55. In an embodiment, the longitudinal axis 55 of the grating 66 may be aligned parallel to the longitudinal axis 25 of the grating 26. Adjacent pairs of the segments 74, adjacent pairs of the segments 76, and adjacent pairs of the segments 78 are separated by gaps 80 having a given dimension along the longitudinal axis 55.

In an embodiment, each of the segments 74, 76, 78 may have a square or rectangular cross-section in a direction parallel to the longitudinal axis 55 and in a direction transverse to the longitudinal axis 55. In an embodiment, the pitch and duty cycle of the segments 74, the segments 76, and/or the segments 78 may be uniform to define a periodic arrangement. In alternative embodiments, the pitch and/or the duty cycle of the segments 74, the segments 76, and/or the segments 78 may be apodized (i.e., non-uniform) to define a non-periodic arrangement. The segments 74, 76, 78 may be dimensioned and positioned at small enough pitch so as to define a sub-wavelength grating-like structure that does not radiate or reflect light at a wavelength of operation.

The grating 66 has a total length that includes the individual lengths for the non-tapered section 68, the inverse taper 70, and the taper 72, and the segments 74, 76, 78 have a width W2 in a direction transverse to the longitudinal axis 55. The width W2 of the segments 74 may be constant over the length of the non-tapered section 68, the width W2 of the segments 76 may increase over the length of the inverse taper 70 with increasing distance from the non-tapered section 68, and the width W2 of the segments 78 may decrease over the length of the taper 72 with increasing distance from the non-tapered section 68. The width W1 of the segments 76 varies in an opposite direction along the longitudinal axis 55 from the width W1 of the segments 78.

The grating 66 may be comprised of a dielectric material, such as silicon-carbon nitride or hydrogenated silicon-carbon nitride, having a refractive index greater than the refractive index of silicon dioxide. In an alternative embodiment, the grating 66 may be comprised of silicon nitride or silicon oxynitride. In an embodiment, the grating 66 may be formed by depositing a layer of its constituent material on the dielectric layer 62 and patterning the deposited layer by lithography and etching processes to form the segments 74, 76, 78. In the representative embodiment, the segments 74, 76, 78 may be disconnected from each other. In an alternative embodiment, a slab layer may connect lower portions of the segments 74, 76, 78. The slab layer may be formed when the grating 66 is patterned, and the slab layer, which is positioned on the dielectric layer 62, has a thickness that is less than the thickness of the segments 74, 76, 78.

In an embodiment, the pattern of the segments 34, 36, 38 of the grating 26 may be identical to the pattern of the segments 74, 76, 78 of the grating 66. In that instance, the dimensions of the segments 34, 36, 38 may be identical to the dimensions of the segments 74, 76, 78, and the segments 34, 36, 38 may be aligned with the segments 74, 76, 78 to provide a full overlap. In an alternative embodiment, the pattern of the segments 34, 36, 38 of the grating 26 may differ from the pattern of the segments 74, 76, 78 of the grating 66. For example, the segments 74, 76, 78 may have a different pitch and/or duty cycle than the segments 34, 36, 38.

Figure 11:
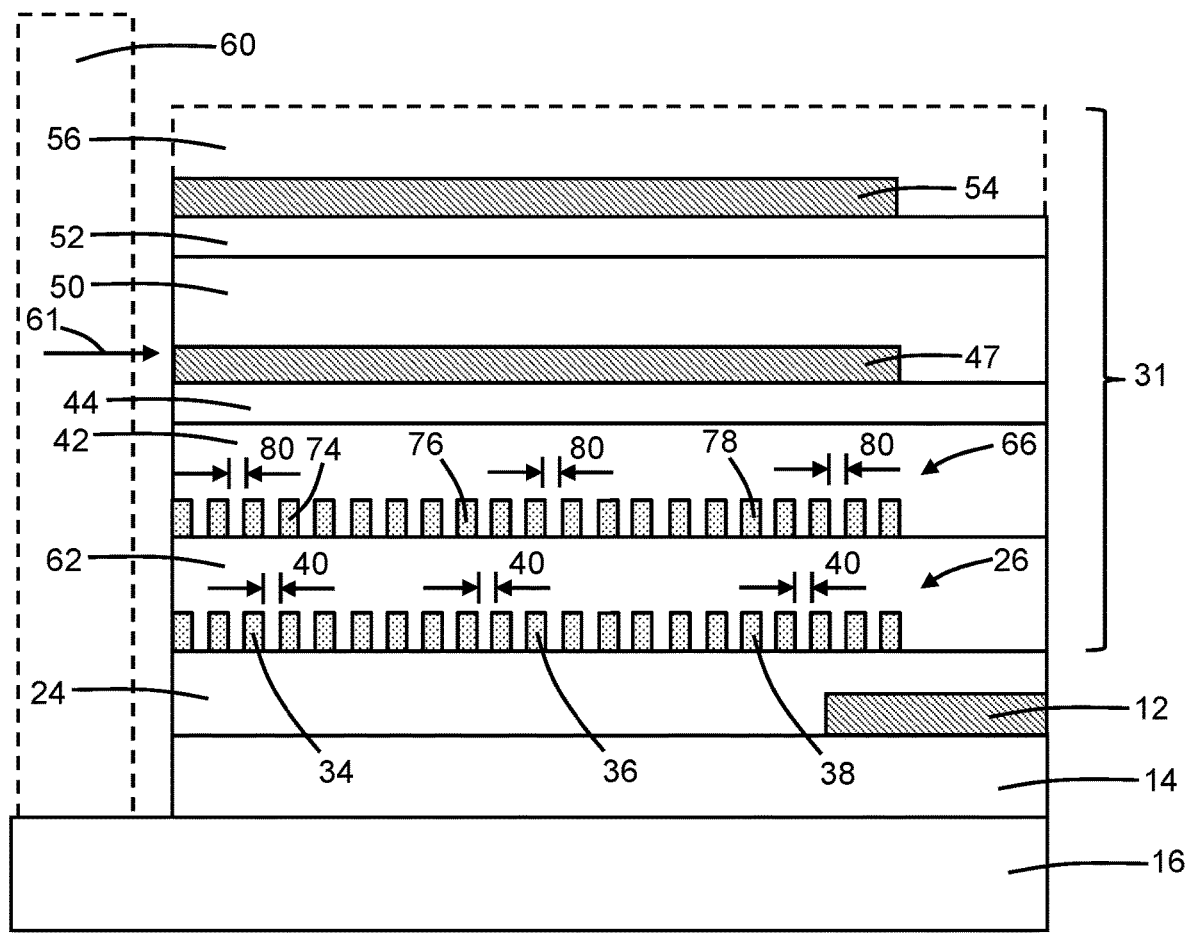
FIG. 11 is a cross-sectional view of the structure at a fabrication stage of the processing method subsequent to FIG. 10.

With reference to FIG. 11 in which like reference numerals refer to like features in FIG. 10 and at a subsequent fabrication stage, the process flow continues as described above to complete the structure 10 that is modified to include the grating 66. In that regard, the dielectric layer 42 may be formed over the grating 66. The dielectric layer 62 may be comprised of a dielectric material, such as silicon dioxide. The grating 66 is embedded in the dielectric layer 62 because the dielectric layer 62 is thicker than the height of the grating 66. The thickness of the dielectric layer 62 and the height of the grating 66 may be adjustable variables. The dielectric material constituting the dielectric layer 62 may have a lower refractive index than the material constituting the grating 66. The dielectric material of the dielectric layer 62 is disposed in the gaps 80 between adjacent pairs of the segments 74, 76, 78. The segments 74, 76, 78 and the dielectric material of the dielectric layer 62 in the gaps 80 may define a metamaterial structure that overlaps with the segments 34, 36, 38 participating in a different metamaterial structure that is located in a lower level of the back-end-of-line stack 31.

Multiple metamaterial structures in multiple levels of the back-end-of-line stack 31 may function to reinforce the improvements, as previously described, provided by a metamaterial structure in a single level of the back-end-of-line stack 31.

Figure 12:
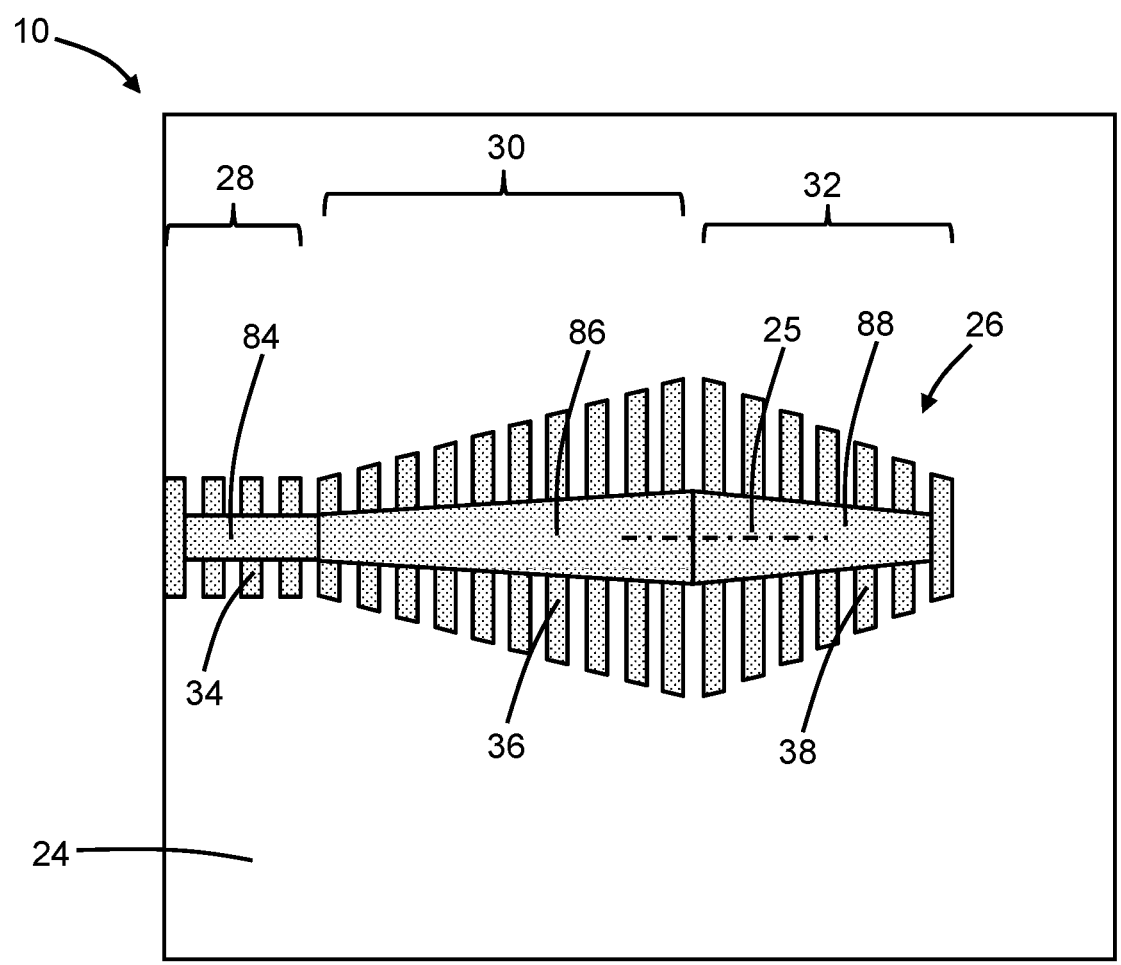
FIG. 12 is a top view of a structure in accordance with alternative embodiments of the invention.

With reference to FIG. 12 and in accordance with alternative embodiments of the invention, the grating 26 may include a rib 84 that is overlaid with the segments 34 of the non-tapered section 28, an inversely-tapered rib 86 that is overlaid with the segments 36 of the inversely-tapered section 30, and a tapered rib 88 that is overlaid with the segments 38 of the tapered section 32. In alternative embodiments, the rib 84 may be omitted from the non-tapered section 28, the inversely-tapered rib 86 may be omitted from the inversely-tapered section 30, and/or the tapered rib 88 may be omitted from the tapered section 32.

Figure 13:
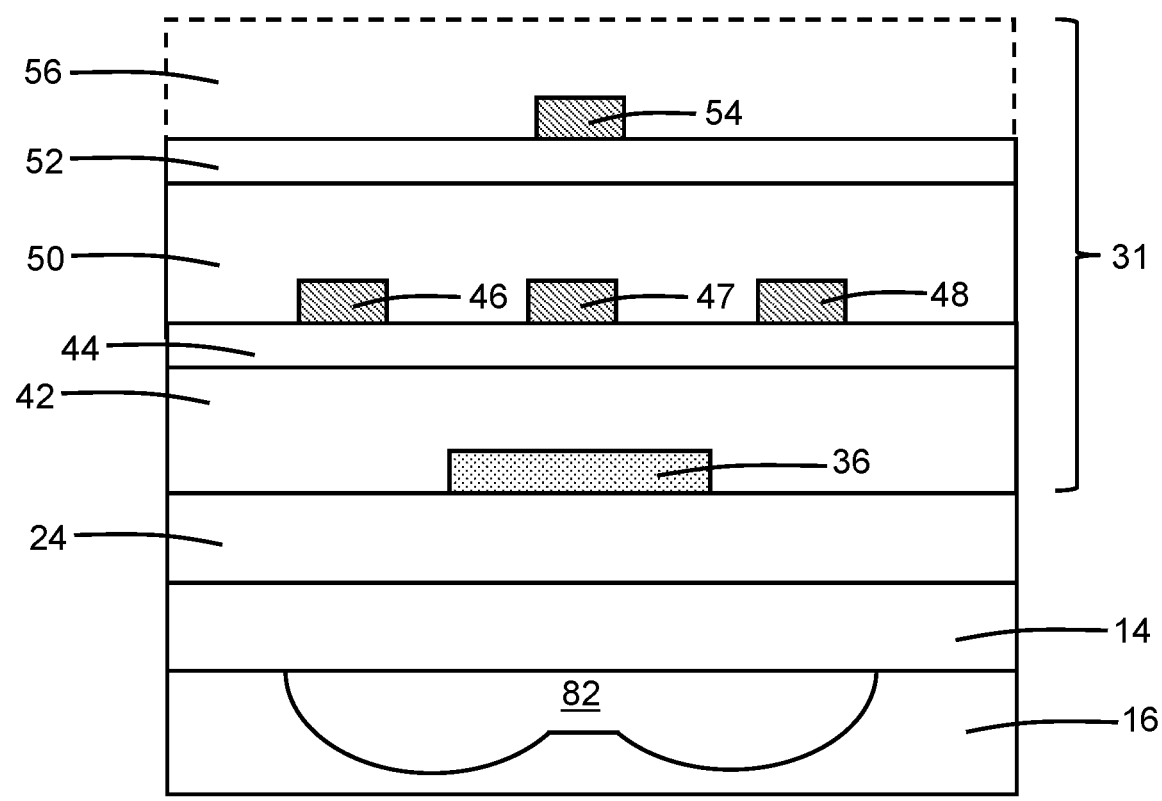
FIG. 13 is a cross-sectional view of a structure in accordance with alternative embodiments of the invention.

With reference to FIG. 13 and in accordance with alternative embodiments of the invention, an undercut 82 may be formed in the substrate 16 beneath the edge coupler. The undercut 82 may be formed by patterning pilot openings penetrating through the dielectric layer 14, and then etching the substrate 16 with access provided by the pilot openings using an isotropic etching process characterized by both lateral and vertical etching components. The undercut 82 may provide additional reductions in the leakage loss to the substrate 16.

Figure 14:
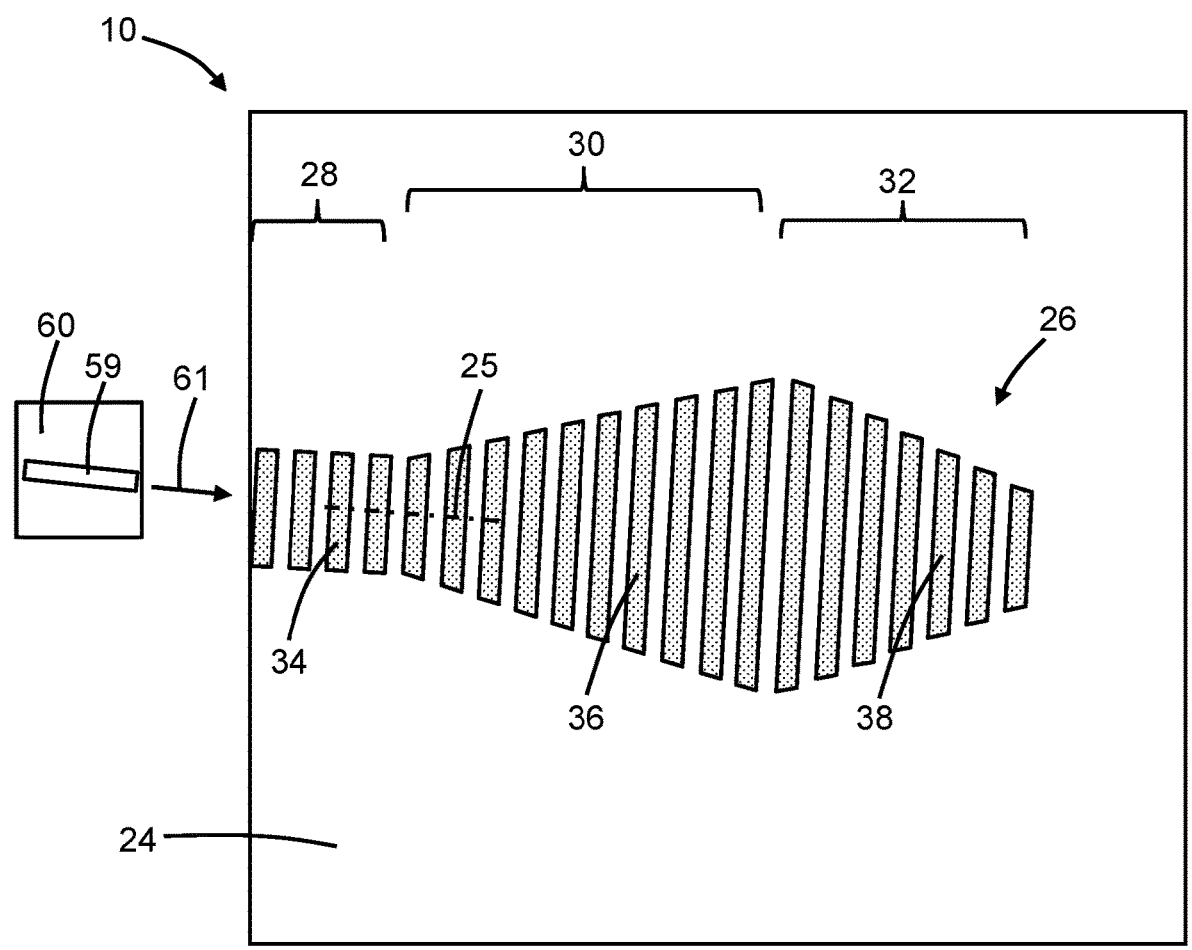
FIG. 14 is a top view of a structure in accordance with alternative embodiments of the invention.

With reference to FIG. 14 and in accordance with alternative embodiments of the invention, the grating 26 may be rotated or tilted at a given angle such that the longitudinal axis 25 is parallel or substantially parallel to the mode propagation direction 61 of a light source 60 that is a semiconductor laser with a light-emitting layer 59 that may also be rotated and tilted at a given angle. The longitudinal axes 35 of the waveguide cores 46, 47, 48 and the longitudinal axis 45 of the waveguide core 64 may be similarly rotated or tilted. In an embodiment, the edge coupler including the grating 26, waveguide cores 46, 47, 48, and waveguide core 54 may be rotated or tilted at the same angle as the light emitting layer 59. The rotation of the grating 26 may maintain parallel incidence of the light-emitting layer 59 and the mode propagation direction 61 relative to the edge coupler.

The methods as described above are used in the fabrication of integrated circuit chips. The resulting integrated circuit chips can be distributed by the fabricator in raw wafer form (e.g., as a single wafer that has multiple unpackaged chips), as a bare die, or in a packaged form. The chip may be integrated with other chips, discrete circuit elements, and/or other signal processing devices as part of either an intermediate product or an end product. The end product can be any product that includes integrated circuit chips, such as computer products having a central processor or smartphones.

References herein to terms modified by language of approximation, such as "about", "approximately", and "substantially", are not to be limited to the precise value specified. The language of approximation may correspond to the precision of an instrument used to measure the value and, unless otherwise dependent on the precision of the instrument, may indicate a range of +/−10% of the stated value(s).

References herein to terms such as "vertical", "horizontal", etc. are made by way of example, and not by way of limitation, to establish a frame of reference. The term "horizontal" as used herein is defined as a plane parallel to a conventional plane of a semiconductor substrate, regardless of its actual three-dimensional spatial orientation. The terms "vertical" and "normal" refer to a direction perpendicular to the horizontal, as just defined. The term "lateral" refers to a direction within the horizontal plane.

A feature "connected" or "coupled" to or with another feature may be directly connected or coupled to or with the other feature or, instead, one or more intervening features may be present. A feature may be "directly connected" or "directly coupled" to or with another feature if intervening features are absent. A feature may be "indirectly connected" or "indirectly coupled" to or with another feature if at least one intervening feature is present. A feature "on" or "contacting" another feature may be directly on or in direct contact with the other feature or, instead, one or more intervening features may be present. A feature may be "directly on" or in "direct contact" with another feature if intervening features are absent. A feature may be "indirectly on" or in "indirect contact" with another feature if at least one intervening feature is present. Different features "overlap" if a feature extends over, and covers a part of, another feature.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A structure comprising:
   a silicon-on-insulator substrate including a semiconductor substrate and a dielectric layer on the semiconductor substrate;
   a first waveguide core on the dielectric layer; and
   a back-end-of-line edge coupler configured to couple light to the first waveguide core, the back-end-of-line edge coupler including a second waveguide core and a first grating positioned in a vertical direction between the semiconductor substrate and the second waveguide core, the second waveguide core including a first longitudinal axis, the first grating including a second longitudinal axis, a first section, a first plurality of segments positioned in the first section with a first spaced-apart arrangement along the second longitudinal axis, a second section, a second plurality of segments positioned in the second section with a second spaced-apart arrangement along the second longitudinal axis, and a third section configured to be positioned between the first section and a light source, the first plurality of segments having a first width that increases over a length of the first section with increasing distance from the third section, the second plurality of segments having a second width that decreases over a length of the second section with increasing distance from the first section, the second longitudinal axis aligned substantially parallel to the first longitudinal axis, and the first plurality of segments positioned along the second longitudinal axis between the third section and the second plurality of segments.

2. The structure of claim 1 wherein the first plurality of segments are separated by a plurality of gaps, and the first grating further includes a dielectric material disposed in the plurality of gaps.

3. The structure of claim 2 wherein the first plurality of segments and the dielectric material comprise a metamaterial structure.

4. The structure of claim 1, wherein:
   the light source is positioned adjacent to the back-end-of-line edge coupler, and the light source is configured to provide the light in a mode propagation direction toward the back-end-of-line edge coupler.

5. The structure of claim 4 wherein the light source is a single-mode optical fiber.

6. The structure of claim 4 wherein the light source is a semiconductor laser.

7. The structure of claim 6 wherein the semiconductor laser includes a light-emitting layer that is tilted at a first angle, and the second longitudinal axis of the first grating is tilted at a second angle equal to the first angle.

8. The structure of claim 4 wherein the first grating includes a rib that is overlaid on the first plurality of segments.

9. The structure of claim 1 wherein the back-end-of-line edge coupler includes a third waveguide core positioned in a lateral direction adjacent to the second waveguide core.

10. The structure of claim 1 wherein the back-end-of-line edge coupler includes a third waveguide core, and the second waveguide core is positioned in the vertical direction between the third waveguide core and the first grating.

11. The structure of claim 1 wherein the the first grating includes a rib that is overlaid on the first plurality of segments and the second plurality of segments.

12. The structure of claim 1 wherein the second waveguide core comprises silicon nitride, and the first grating comprises silicon-carbon nitride or hydrogenated silicon-carbon nitride.

13. The structure of claim 1 wherein the second waveguide core comprises silicon nitride, and the first grating comprises silicon nitride or silicon oxynitride.

14. The structure of claim 1 wherein the semiconductor substrate includes an undercut, and the back-end-of-line edge coupler has an overlapping arrangement with the undercut in the semiconductor substrate.

15. The structure of claim 1 wherein the back-end-of-line edge coupler includes a second grating positioned in the vertical direction between the first grating and the second waveguide core, the second grating including a third longitudinal axis and a third plurality of segments positioned with a third spaced-apart arrangement along the third longitudinal axis, and the third longitudinal axis aligned substantially parallel to the first longitudinal axis.

16. The structure of claim 1 wherein the third section includes a third plurality of segments positioned with a third spaced-apart arrangement along the second longitudinal axis, and the third plurality of segments have a third width that is constant over a length of the third section with increasing distance from the second section.

17. A method comprising:
forming a first waveguide core on a dielectric layer of a silicon-on-insulator substrate, wherein the silicon-on-insulator substrate includes a semiconductor substrate, and the dielectric layer is disposed on the semiconductor substrate; and forming a back-end-of-line edge coupler configured to couple light to the first waveguide core, wherein the back-end-of-line edge coupler includes a second waveguide core and a grating positioned in a vertical direction between the semiconductor substrate and the second waveguide core, wherein the second waveguide core includes a first longitudinal axis, the grating includes a second longitudinal axis, a first section, a first plurality of segments positioned in the first section with a spaced-apart arrangement along the second longitudinal axis, a second section, a second plurality of segments positioned in the second section with a second spaced-apart arrangement along the second longitudinal axis, and a third section configured to be positioned between the first section and a light source, the first plurality of segments having a first width that increases over a length of the first section with increasing distance from the third section, the second plurality of segments having a second width that decreases over a length of the second section with increasing distance from the first section, the second longitudinal axis aligned substantially parallel to the first longitudinal axis, and the first plurality of segments positioned along the second longitudinal axis between the third section and the second plurality of segments.

* * * * *